Jan. 4, 1944.   W. J. FORREST ET AL   2,338,417
FILTERING AND LIKE TREATMENT OF FLUIDS
Filed Feb. 21, 1940   2 Sheets-Sheet 1
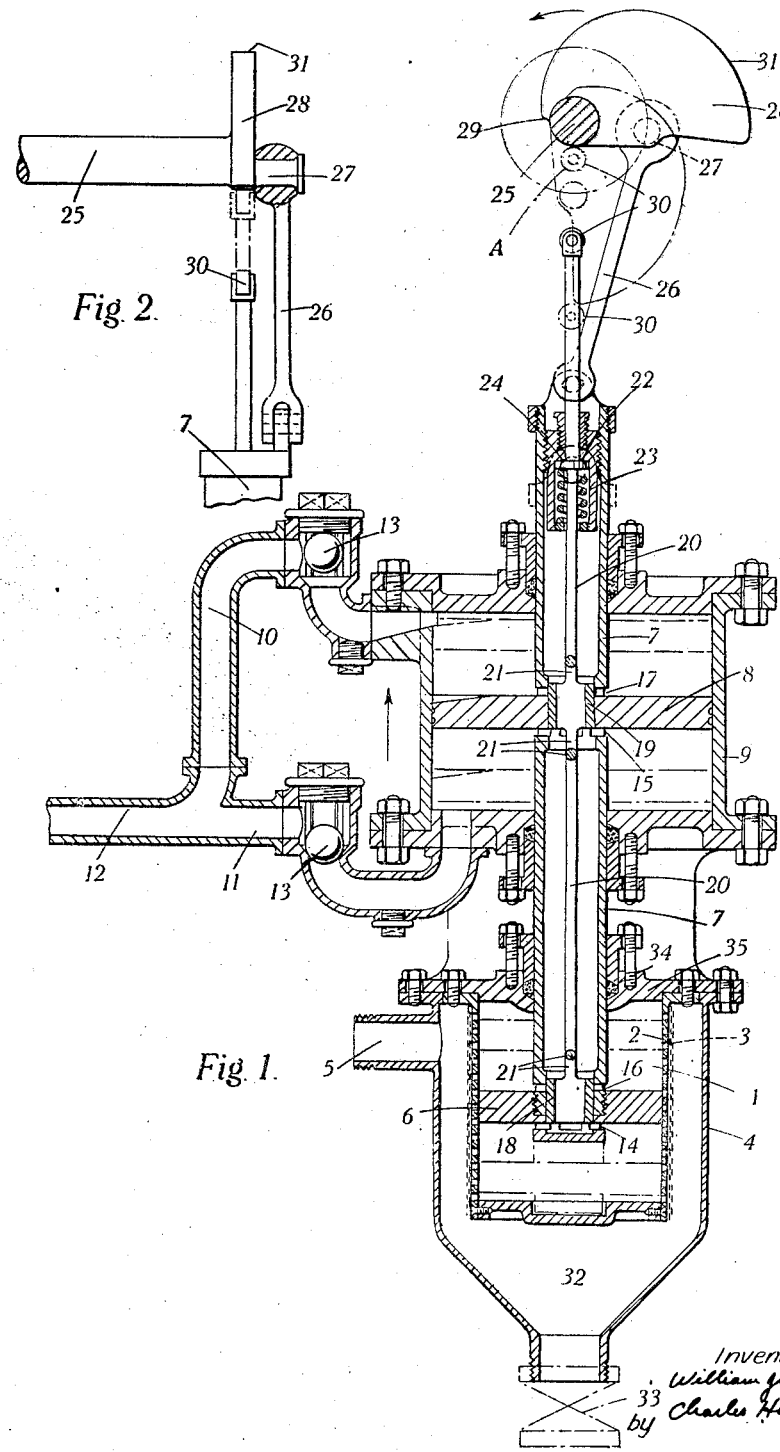

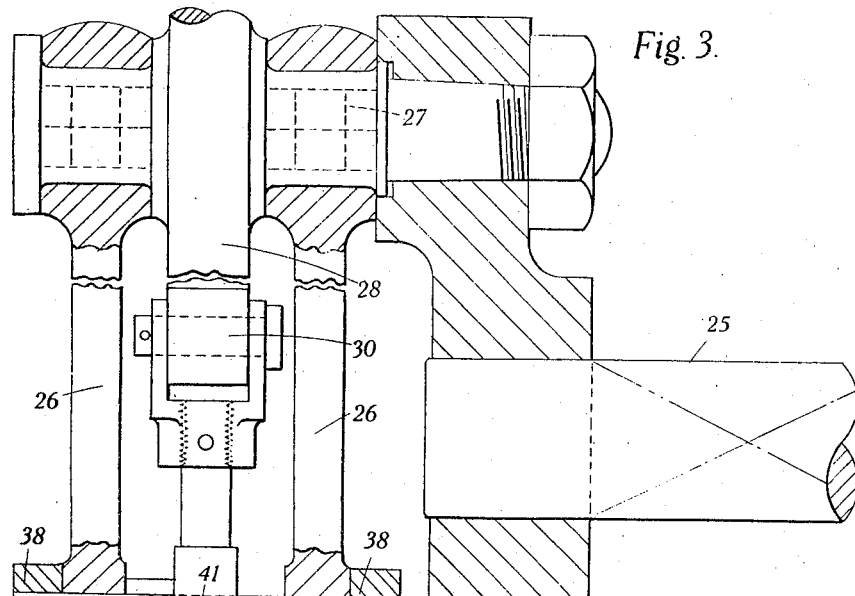
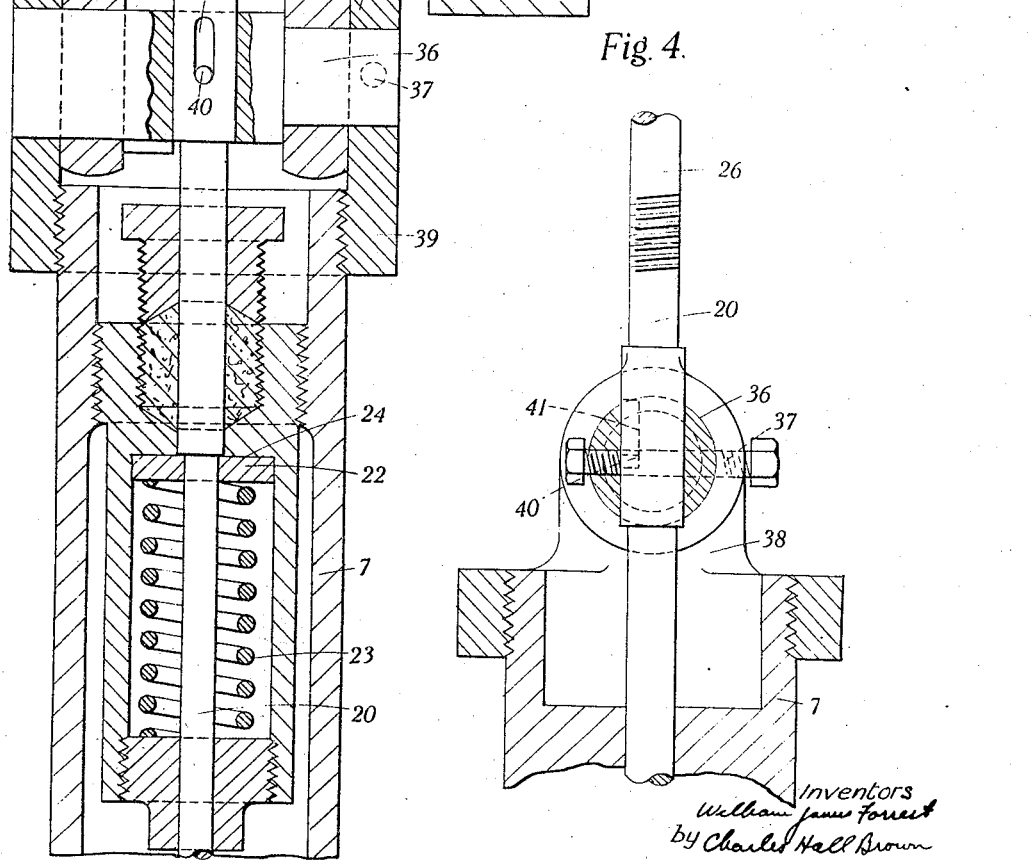

Patented Jan. 4, 1944

2,338,417

UNITED STATES PATENT OFFICE 2,338,417

FILTERING AND LIKE TREATMENT OF FLUIDS

William James Forrest, Ilford, and Charles Hall Brown, Catford, London, England

Application February 21, 1940, Serial No. 320,016 In Great Britain June 15, 1939

14 Claims. (Cl. 210—167)

The present invention relates to the filtering or straining of fluids, more especially to obtain a clean liquid filtrate from liquids, e. g., viscous liquids such as oils, paints, varnishes or other liquids containing pigments, powders, crystals or other solid matter in suspension in a finely divided state, but it can be used for the filtering or straining of other liquids or of dust-laden or powder-containing gases, vapours or the like. The passing of some liquids, such as varnishes and oils, through separating surfaces is sometimes termed "refining" and it is to be understood that the term "filtering" used herein is intended to cover such treatments. In the following description, the filtering or straining means which may be gauze (e. g., of metal) silk, cloth, paper, wash-leather or other material or may be slots or the like produced by finely spaced plates or coiled wires or by other suitable means is termed filtering medium.

The object of the present invention is to provide an improved method of effecting the filtration and of cleaning the filtering medium. The invention further aims at facilitating the separation of the dross, i. e., the particles held back by the filtering medium, whilst avoiding waste of, or the introduction of foreign materials into, the liquid being treated, and at effecting these objects in such a way that the apparatus and filtering medium are protected as far as possible from injury and the filtration can proceed continuously whilst the filtering medium is being cleaned.

To these ends the present invention comprises a filtering apparatus in which a reciprocating plunger is arranged to work in the filtrate chamber in synchronism with a pump which causes or assists the displacement of filtrate from the filtrate chamber for collection in such a manner that simultaneously with the passage of fluid in one direction through the filtering medium for collection, part of the filtrate is passed in the other direction by the plunger through the filtering medium for the purpose of cleaning the latter. The pump is a plunger pump the stroke of the plunger being arranged to synchronise with the stroke of the plunger in the filtrate chamber.

We may use an arrangement of valves for periodically opening and closing the variable compartments formed in the chamber on each side of the plunger which valves are so operated at or near the end of one stroke or the beginning of the next stroke of the plunger that at or about the commencement of the stroke of the plunger, the spaces in front of and behind the plunger are respectively closed and opened to enable the plunger to force filtrate in front of it in the reverse direction through the filtering medium whilst fluid is passing into the chamber behind the plunger.

It is preferred to use a pump cylinder of greater volume than the filtrate chamber so that for equal movements of the respective plungers a greater volume is displaced by the pump plunger in order to assist the displacement of filtrate from the filtrate chamber to the pump cylinder. The difference between the respective volumes may be varied according to the materials being treated and/or the fineness of the filtering medium. For treating for example thin oil with a small dirt content a larger pump capacity could be used than for treating viscous oil with a high dirt content. The same constructional form of apparatus may be used for different materials by fitting liners into the pump cylinder to diminish its capacity when treating materials which do not flow so readily through the filtering medium and behind the plungers, and using an appropriately smaller pump plunger, the filtrate chamber and plunger remaining unaltered. In some cases, especially when dealing with materials which flow very slowly through the filtering medium, it may be desirable to use a pump of smaller capacity than that of the filtrate cylinder and plunger. The apparatus may be so arranged that whilst the suction sides of the filtrate chamber and pump cylinder are in communication to permit a fresh charge of the filtrate to be drawn into the pump cylinder, the pressure sides are closed from one another to permit filtrate to be forced out of the filtrate chamber through the filtering medium for cleaning and out of the pump cylinder to discharge.

In one preferred form of the apparatus the plungers are on a hollow rod having openings adapted to place the interior of the rod alternately into communication with each side of each plunger and a slide valve is provided for closing the openings on the pressure side of each plunger whilst the openings on the suction side of each plunger are opened. The valves may be in the form of sleeve valves carried by a rod passing through the hollow rod.

The plunger rod may be driven by a crank or eccentric. Alternatively the pump may be operated by the pressure of the filtrate. Cam means serve well for suddenly closing one set of openings and opening the other set in the hollow plunger rod when the plungers have reached or nearly reached the end of each stroke or have just commenced a fresh stroke and the cam may conveniently be mounted on the crank shaft or pin. Spring means may be employed to return the rod for operating the valves in the reverse direction.

The cam may be in the form of a peripheral cam provided with a quick acting portion to move the rod suddenly in order to operate the valves when the plungers are at or about the end of one stroke or are commencing another and the cam may have a following peripheral portion for maintaining the rod depressed until the plungers are at or about the end of the next stroke or are commencing a third.

When the pump is self-acting, i. e., is driven by the pressure of the filtrate derived from the head or pressure of the crude material, a flywheel may be provided on the crank shaft to bring the crank pin over the dead centre, or two machines may be arranged side by side with the cranks out of phase, e. g., by 90°.

Each end of the pump cylinder may be connected by way of a branch pipe to the discharge pipe, each branch having a non-return valve which opens by the fluid pressure on the corresponding discharge stroke of the pump.

The filtering medium and the filtrate chamber may be located in a receiver for the crude material and the latter so constructed and arranged as to permit dross forced off the filtering medium to settle by gravity out of the crude material in the receiver. Where the dross is heavier than the liquid, the receiver may be provided with a sump, e. g., of funnel shape, preferably valve-controlled so that the dross can be drawn off from the bottom of the receiver, if desired without stopping the process of filtration. If the dross is lighter than the liquid it may be collected from the top. The crude material may be fed to the receiver by gravity or may be pumped into the receiver, or if desired instead of providing a receiver for the crude material the filtering medium and the filtrate chamber can be submerged in a bulk of liquid to be filtered.

The invention enables the filtering medium to be fixed and the plunger rod to operate without the risk of any dross obtaining access to the glanded joint of the plunger rod with the wall of the filtrate chamber through which the rod passes, or to any other joint between moving parts involved in the process of filtering and cleaning.

In order that the invention may be the more readily understood, reference is hereinafter made to the accompanying drawings, in which Fig. 1 is a vertical section through one form of apparatus according to the invention and Fig. 2 is a side view of a crank drive for the pump and filter plungers. Fig. 3 is a side sectional view of a modified and preferred form of crank drive and Fig. 4 an end sectional view thereof.

In the drawings, the filtrate chamber 1 is formed by a cylindrical drum 2 having a perforated wall around which is wrapped the filtering medium 3. The drum is located in a receiver 4 to which crude material to be filtered is led, e. g., under the pressure of gravity or pump. If the filtering apparatus is arranged above the bulk of the crude material to be filtered, the crude material may be drawn into the receiver by suction. The inlet for the crude material to the receiver is marked 5.

In the filtrate chamber 1 is arranged a plunger 6 which is fast with a hollow plunger rod 7 which also carries a second plunger 8 which works in a cylinder 9 the plunger 8 and cylinder 9 serving as a pump for the purpose hereinafter described. One end of the pump cylinder 9 is in communication with a branch 10 and the other end with a branch 11 of a discharge pipe 12, each branch including a non-return valve 13.

The hollow plunger rod is provided with openings 14 and 15 which are adapted to place the interior of the rod in communication with the filtrate chamber on one side of the plunger 6 and the pump cylinder on one side of the pump plunger 8 respectively and openings 16 and 17 serve to place the interior or the rod in communication with the filtrate chamber and pump cylinder on the opposite sides of the two plungers. These openings are controlled by sleeve valves 18 and 19 which are connected by way of spiders 21 with a rod 20 which is mounted to slide in the hollow plunger rod. The valve rod 20 is provided with a collar 22 which is urged by a spring 23 against a shoulder 24 in the interior of the hollow plunger rod, the spring thereby normally tending to hold the sleeve valves in the position shown in Fig. 1 of the drawings.

The plunger rod is operated by a crank shaft 25 by connection through a connecting rod 26 with crank pin 27, and mounted on the crank shaft is a cam 28 having a steep cam portion 29. The valve rod is provided with a cam follower 30 at its upper end.

In the drawings the plungers are shown in a mid-position with the plunger rod rising. Filtered material is entering below the plunger 6 and passes from the filtrate chamber through opening 14 up the hollow rod, some part of it flowing through the opening 15 into the pump cylinder below the pump plunger 8. Meanwhile the openings 16 and 17 are kept closed by the sleeve valves. When the plungers are at or near the end of their upward stroke and the cam roller has reached its top position A, the steep portion 29 of the cam has come to the roller, with the result that the cam portion 29 suddenly moves the valve rod downwards with reference to the hollow plunger rod and thereby causes the sleeve valves to close openings 14 and 15 and open openings 16 and 17. Consequently on the downward stroke of the plungers filtrate which has been collected during the previous upward stroke in the filtrate chamber is forced out in the reverse direction through the filtering medium in order to cleanse the latter and filtrate which has collected in the pump cylinder is forced past the non-return valve 13 in branch 11 to discharge. During this time filtered material is now passing into the filtrate chamber on the upper side of the plunger 6 and through opening 16 and is escaping into the upper side of the plunger in the pump cylinder through opening 17. When the cam portion has depressed the sleeve valve the cam roller 30 follows the peripheral portion 31 of the cam, such latter portion being so designed as to keep the valve rod depressed until the plungers have about reached the end of their downward stroke. The cam having then reached the position shown in dotted lines soon allows the spring to lift the valve rod with reference to the plunger rod and return the sleeve valves into the position shown in the drawings so that a fresh charge of filtrate is then drawn in below the plungers whilst filtrate drawn in during the previous stroke is now forced in the reverse direction through the filtering medium for cleaning whilst another part of the filtrate is forced out past the non-return valve 13 through branch 10 to discharge.

Dross forced off the filtering medium separates out by gravity from the crude material in the receiver and collects in the sump 32 which may be valve controlled and the valve 33 may be periodically opened to allow the collected dross to flow away, for example, into a receptacle placed below the receiver.

The crank and cam are so designed that when the plungers are in the mid-position the crank pin lies below the horizontal plane through the crank shaft axis so as to allow the plungers to rise and fall from the mid-position to the same extent.

The upper part of the space in the hollow plunger rod serves as a relief and cushioning device, air trapped in this chamber acting in the manner of an air spring.

The drawings show the crank arrangement diagrammatically and if desired two connecting rods could be provided in order to provide a more balanced arrangement.

Figs. 3 and 4 show such an arrangement, the two connecting rods 26, at their small ends being rotatably mounted on a shouldered pin 36 which is pinned at 37 to one upstanding projection of a pair of side projections 38 from a screwed sleeve 39 at the upper end of the hollow valve rod. These figures also show a means for preventing the valve rod 20 from rotating, such means consisting of a pin 40 the small shouldered down end of which is arranged in a slot 41 in the valve rod.

Any suitable means such as a key and key-way may be provided to restrain the valve rod from rotation.

The invention enables the filtering medium to be kept fixed and for the hollow plunger rod to work in a packed joint 34 in the top wall 35 of the filtrate chamber so that there is no risk of dross obtaining access to the joint and affecting the efficiency of the apparatus.

The speed of reciprocation of the plunger may be varied according to the material under treatment and according to the rate of flow of fluid through the filtering medium. The crank shaft could be driven from a motor through any suitable gearing which may be variable to regulate the speed of reciprocation of the plungers.

If desired the pump cylinder and the filtrate chamber could be separated by a common wall.

What we claim is:

1. In a filtering or straining apparatus comprising a filter cylinder having end walls, a filtering wall between said end walls providing the inlet to said cylinder and a plunger in said cylinder adapted to return filtrate through the filtering wall for cleaning it, the combination of a cylinder co-axial with said filter cylinder and a plunger in said second cylinder forming therewith a pump, a hollow rod connecting said plungers, means to displace said rod and said plungers so as to form a suction compartment in each cylinder, porting means communicating between the interior of said hollow rod and the said compartments, valve means and means co-operating with said plunger displacing means for displacing said valve means to close said pump cylinder suction compartment from the filter cylinder by way of said hollow rod during the return stroke, said compartment having outlet means for the escape of fluid therein placed under pressure by the pump plunger.

2. A filtering or straining apparatus comprising a filter cylinder having end walls and a filtering wall between said end walls providing the inlet to said cylinder, a reciprocable plunger in said cylinder, a cylinder co-axial with said filter cylinder and a reciprocable plunger in said second cylinder forming therewith a pump, a rod connecting said plungers and means to displace said rod and said plungers thereby to create an expanding suction compartment behind the plunger in each cylinder, means placing said compartments in communication to allow filtrate to enter the pump cylinder from the filter cylinder, valve means co-operating with said communication means and means for actuating said valve means at the end of each forward stroke of the plungers to close from each other said compartments which have been expanding, said compartments diminishing in size on the return stroke of the plungers the filtrate previously drawn thereinto being placed under pressure, and means permitting the discharge of such filtrate from said diminishing pump cylinder compartment, filtrate which is under pressure in the filter compartment escaping through the filter wall.

3. A filtering or straining apparatus comprising a filtering cylinder having end walls and a filtering wall between said end walls providing the inlet to said cylinder, a reciprocable plunger in said cylinder, a cylinder co-axial with said filter cylinder and a reciprocable plunger in said second cylinder forming therewith a pump, a hollow rod extending through and connecting said plungers and means to displace said rod and said plungers thereby to create a suction compartment behind and a pressure compartment in front of the plunger in each cylinder, said hollow rod being apertured at each side of each of said plungers for placing said suction compartments in communication to allow filtrate to enter the pump cylinder from the filter cylinder by way of the interior of said hollow rod, means permitting the discharge of the filtrate which is under pressure from said pump cylinder pressure compartment, the filtrate which is under pressure in the filter cylinder being forced through the filter wall, valve means co-operating with the apertures in said hollow rod, and means for actuating said valve means at the end of each forward and reverse stroke of the plungers to close from each other said compartments which have been expanding and acting as suction compartments and to open to each other the other compartments, so that filtrate is drawn into the cylinder and discharged at each stroke.

4. Filtering or straining apparatus comprising a chamber having a cylindrical filtering wall providing the inlet thereto, a plunger in said chamber, a cylinder having end walls co-axial with said chamber, a plunger in said cylinder forming therewith a pump, a hollow rod forming a unit with said plungers, means to reciprocate said unit thereby to create suction and pressure compartments in both said chamber and said cylinder, outlets from said pump cylinder on each side of said plunger therein and non-return valve means controlling said outlets and operative to open for discharge from the cylinder, said hollow rod and plunger unit having ports therein at each side of each plunger providing communication between the interior of the rod and said chamber and cylinder on each side of the plunger thereof, valves operable to close the ports leading to the chamber on the pressure side of the plunger and the corresponding side of the cylinder, and to open the ports leading to the cylinder and chamber on the other side of said plungers, means for actuating said valves at the end of each forward and reverse stroke of the plungers so that the ports which were closed are opened and vice versa, allowing filtrate to be forced out through the filtering wall and from the cylinder on the reverse stroke of the plungers while allowing the pump to draw in filtrate from the chamber to the cylinder, irrespective of the direction of motion of the plungers.

5. Filtering or straining apparatus as in claim 4, in which said valve-actuating means includes means to reposition the valves at approximately the time the plungers move in a reverse direction.

6. A filtering or straining apparatus comprising a chamber having a cylindrical filtering wall providing the inlet to the chamber, a plunger in said chamber, a walled cylinder co-axial with said chamber of greater diameter than that of said chamber, a plunger in said cylinder which displaces a greater volume than the first plunger and forms with the cylinder a pump, a hollow rod connecting said plungers and means for axially displacing said rod and said plungers along said chamber and cylinder thereby to create a suction compartment in both said chamber and said cylinder, said suction compartment in the cylinder having an outlet and a valve which closes said outlet, said hollow rod being apertured so as to place the interior of said hollow rod and the remote side of one of said plungers in communication, said hollow rod being also ported to place said side of the plunger in communication with the corresponding side of the other plunger so that when the chamber and cylinder on such sides are enlarging the pump draws in filtrate into the cylinder by way of said aperture and said hollow rod, valves controlling said ports and aperture in said rod, and means for actuating said valves at the time of reversal of the stroke of the plungers to close said port and said aperture and thereby to close from each other and from the interior of the hollow rod those compartments which have been acting as the suction compartments so that when such compartments are progressively reduced in volume filtrate therein is placed under pressure, and means permitting the discharge of the filtrate which is under pressure from said diminishing pump cylinder compartment, filtrate which is under pressure in the filter cylinder escaping through the filter wall.

7. A filtering or straining apparatus according to claim 2, in which said cylinder and cylinder plunger are greater in diameter than said chamber and chamber plunger so that the cylinder plunger displaces a greater volume than the chamber plunger.

8. Filtering or straining apparatus according to claim 4, in which the said valves are sleeve valves on a valve rod which passes through the hollow plunger rod, and means for actuating said valve rod at each reversal of the plungers.

9. A filtering or straining apparatus comprising a closed chamber having end walls and a filtering wall between said end walls providing the inlet to said chamber, a plunger in said chamber reciprocable therein along said filtering wall for forming variable compartments in said chamber on each side of the plunger, a walled cylinder co-axial with said chamber, a plunger in said cylinder reciprocable therein so as to form variable compartments in said cylinder on each side of the plunger therein, said plungers being connected by a hollow rod, ports in said rod placing the interior of said rod in communication with the adjacent compartments in the chamber and cylinder respectively, an opening formed through each plunger adapted to place the interior of said rod in communication with the remote compartments in said chamber and cylinder respectively and valve means in said rod adapted to close the port in the rod leading to one of said adjacent compartments and the opening in the plunger leading to one of said remote compartments, leaving open the other port in the rod and the opening in the other plunger leading to the compartments of the chamber and cylinder which are for the time being the suction compartments and means for effecting actuation of said valves at each forward and reverse stroke of the plungers, so that the port and opening previously opened are closed and vice versa, means for imparting reciprocatory motion to said plungers, and means permitting the discharge of the filtrate which is under pressure from said diminishing pump cylinder compartments, filtrate which is under pressure in the filter cylinder escaping through the filter wall.

10. A filtering or straining apparatus comprising a closed chamber having end walls and a filtering wall between said end walls providing the inlet to said chamber, a plunger in said chamber, a walled cylinder co-axial with said chamber, a plunger in said cylinder forming therewith a pump, a hollow rod forming a unit with said plungers, means for reciprocating said unit thereby to cause said plungers to create a suction compartment in both said chamber and said cylinder, said suction compartment in the cylinder having an outlet and a valve normally closing said outlet, at least one of said plungers being apertured so as to place the interior of said hollow rod and the compartment on the suction side of said apertured plunger in communication, said hollow rod being ported to provide communication with the compartment on the suction side of the other plunger so that filtrate can enter both said suction compartments, valves movable relatively to said plungers controlling said port and aperture and means for operating said valves at the time of reversal of the reciprocatory stroke of the plungers to close said port and said aperture and thereby to close from each other and from the hollow rod those compartments which have been acting as the suction compartments so that, during the reverse reciprocatory motion of the plungers such compartments are progressively reduced in volume and the filtrate therein is placed under pressure, and means including said normally closed outlet valve permitting the discharge of the filtrate which is under pressure from said diminishing pump cylinder compartment, filtrate which is under pressure in the filter cylinder escaping through the filter wall.

11. A filtering or straining apparatus according to claim 10, in which said valves are carried by a common valve rod arranged in said hollow plunger rod and cam means operable in synchronism with said means for reciprocating said unit for actuating said valve rod to reverse positions sharply at each reversal of the stroke of the plungers.

12. A filtering or straining apparatus according to claim 10, in which said valves are carried by a common valve rod arranged in said hollow rod, a rotary cam timed to actuate said rod and thereby said valves suddenly relatively to the hollow rod when the plungers are approximately at the point of reversal of their motion, said rotary cam comprising a quick-acting portion to move the valve rod suddenly in one direction and a following portion for maintaining the rod in its actuated position until the plungers reach approximately the other point of reversal, and spring means for then effecting a sudden movement of the rod in the opposite direction.

13. A filtering or straining apparatus according to claim 2, in which said filtrate chamber is contained within a receiver, said receiver having an inlet for the crude material and said chamber being situated at such a level in said receiver as to permit dross forced off the filtering wall by the filtrate forced back therethrough to separate out by gravity and settle in the receiver away from the said chamber.

14. A filtering or straining apparatus according to claim 10 having a crank or eccentric means for reciprocating said plunger and hollow rod unit and a rotary cam for operating said valves, said cam being rotatable about said crank shaft.

WILLIAM JAMES FORREST.
CHARLES HALL BROWN.